Figure 1:
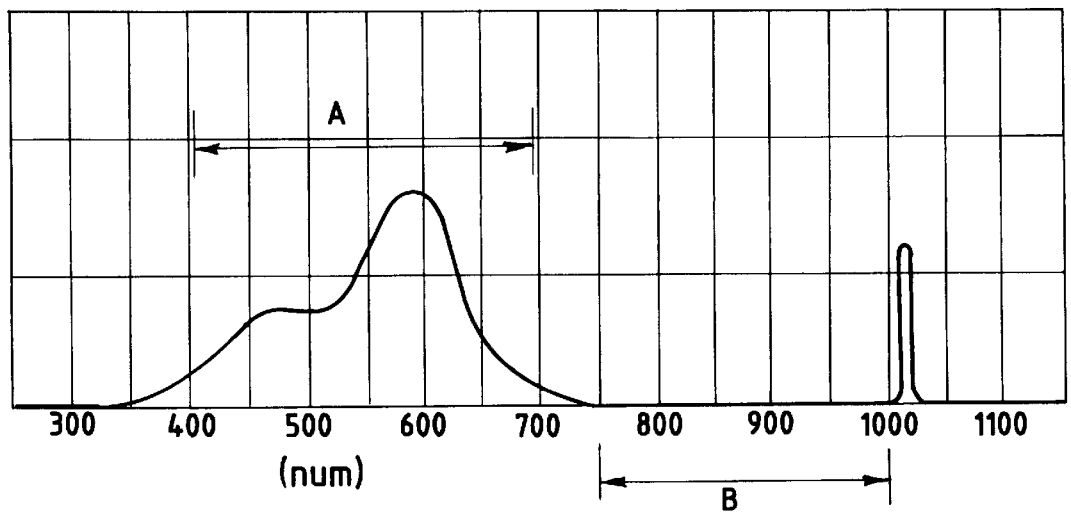

United States Patent [19]
Steinel

[11] Patent Number: 6,160,352
[45] Date of Patent: Dec. 12, 2000

[54] AUTOMATED SWITCHING DEVICE WITH FEEDBACK RESISTANCE FOR LIGHTING MEANS

[76] Inventor: Heinrich Wolfgang Steinel, Meerwiesen Strasse 35, D-33442 Herzebrock-Clarholz, Germany

[21] Appl. No.: 09/209,154

[22] Filed: Dec. 10, 1998

Related U.S. Application Data

[63] Continuation-in-part of application No. 08/765,052, filed as application No. PCT/EP96/01692, Apr. 23, 1996, abandoned.

[30] Foreign Application Priority Data

Apr. 24, 1995 [DE] Germany ............................. 195 14 972

[51] Int. Cl.⁷ .................................................. H05B 37/02
[52] U.S. Cl. ......................... 315/156; 315/158; 315/159; 250/214 AL
[58] Field of Search ..................................... 315/149–151, 315/156–159, 82; 250/206, 214 AL, 214 B, 214 C, 214 L, 214 RC

[56] References Cited

U.S. PATENT DOCUMENTS

| | | |
|---|---|---|
| 4,281,365 | 7/1981 | Elving et al. . |
| 4,449,074 | 5/1984 | Luchaco . |
| 5,182,502 | 1/1993 | Slotkowski et al. . |
| 5,329,206 | 7/1994 | Slotkowski et al. . |

FOREIGN PATENT DOCUMENTS

| | | |
|---|---|---|
| 0 447 136 | 9/1991 | European Pat. Off. . |
| 0 563 696 | 10/1993 | European Pat. Off. . |
| 34 04 085 | 8/1984 | Germany . |
| WO 86/05351 | 9/1986 | WIPO . |

*Primary Examiner*—David Vu
*Attorney, Agent, or Firm*—Tilton Fallon Lungmus & Chestnut

[57] ABSTRACT

An automatic switching device for flourescent light has a light sensing element that reacts to ambient light and a switching unit designed to react to an output signal from the light sensing element and to activate or deactivate the flourescent light. The switching unit has a reference threshold generator. The flourescent light is activated or deactivated depending on whether the output signal from the light sensing element exceeds or falls below a threshold generated by the reference threshold generator and the threshold level depends on the luminosity sensed by the light sensing element. The switching unit further includes a delay designed for preventing signal processing by the switching unit for a present period of time upon switching on of the flourescent light.

18 Claims, 5 Drawing Sheets

AUTOMATED SWITCHING DEVICE WITH FEEDBACK RESISTANCE FOR LIGHTING MEANS

CROSS REFERENCES TO RELATED APPLICATIONS

This application is a Continuation-in-Part of U.S. patent application Ser. No. 08/765,052, filed Apr. 1, 1997, now abandoned, which was a United States National Stage filing of PCT/EP96/01692, filed Apr. 23, 1996.

The invention concerns a dusk-to-dawn switch as set forth in the classifying portion of claim 1.

Lights which have a fluorescent lamp and a photoelectric element for sensing ambient brightness are known from the state of the art. The fluorescent lamp can then be suitably automatically switched on and off respectively in dependence on the ambient brightness sensed in that way. An arrangement of that kind, which constitutes the general kind of apparatus involved, is known for example from DE 43 11 804 A1.

However the problem arises in connection with the automatic control of such a light in dependence on the ambient light that the light produced by the lamp itself can also fall on the sensing element for ambient light and in that way, virtually in the form of an optical feedback effect, can not only severely falsify the measurement result, but the light can possibly no longer be switched off at all with increasing ambient light.

In the case of the described light from the state of the art, that problem is evidently easily remedied in a simple manner by virtue of the fact that the light from the lamp itself is cut out of the optical beam path of light sensing, that is to say the arrangement has a shutter means to prevent light from the fluorescent lamp itself falling on the photoelectric element.

As long as a light of that kind is used outside, that construction affords satisfactory results and generally prevents troublesome interference from the light produced by the lamp itself. When the arrangement is used in the vicinity of a reflecting body however it is already no longer possible to ensure that light from the lamp itself does not reach the photoelectric cell by means of reflection and thereby drastically impair the switching function.

The object of the present invention is therefore that of providing a dusk-to-dawn switch for a light as set forth in the classifying portion of claim 1, which eliminates that disadvantage from the state of the art and which in particular ensures regular switching operation unaffected by the light emitted by the lighting.

Advantageously in that respect active displacement of the response threshold for activation and deactivation—in which respect those terms mean not only switching on and switching off respectively but also stepwise or stepless variation in the lighting output of the lighting means—provides, in dependence on the amount of light sensed, that the arrangement does not involve evaluation which is independent of the (intrinsic) light conditions, as in the case of static thresholds, but on the contrary threshold displacement occurs directly in dependence on the light incident on the light sensing element. In other words, in specific terms the amount of intrinsic light from the lamp itself is measured by the light sensing element, which in that way can also take account of particular reflection conditions or ageing phenomena in respect of the intrinsic light, such phenomena being dependent on the period of operation; in accordance with the present invention such effects remain without any influence on the operating performance of the dusk-to-dawn switch.

Thus, a pair of thresholds is fixed by means of a hysteresis device in order to exclude flickering or the like of the light in the event of short-term fluctuations; furthermore in accordance with a preferred development the spacing of the thresholds in terms of the hysteresis itself is variable, wherein establishment of threshold values in that way can then advantageously be effected by means of storage or memory values which are predetermined in tabular manner. In that way it is then possible to adapt the level of hysteresis to respective ambient light conditions so that the operating performance of the dusk-to-dawn switch according to the invention is further improved. In that respect the invention also covers using the fact that a brightness value falls below or rises above a respective threshold as a trigger for a subsequent switching or control procedure—either for digitally switching the lighting means on and off, or for stepwise or stepless dimming thereof.

Sensing the incident light by means of the measuring device over a predetermined period of time and forming average values, in accordance with a development of the invention, further reduces the sensitivity of the dusk-to-dawn switch in relation to short-term fluctuations in light.

Furthermore, in accordance with another advantageous development the hysteresis effect which produces the pair of thresholds and which in accordance with the invention is also formed from a current brightness value is also dependent on the preceding switching states of the lighting means: if for example the preceding concluded switch-on period was shorter than a predetermined value, then thereupon in the next switch-on cycle the hysteresis effect would be correspondingly increased, in which case—in the case of substantially uniform lighting conditions—this would result in a longer switch-on period; the switching-on and switching-off performance of the lamp can also be automatically and dynamically optimized with that arrangement.

In accordance with a further preferred embodiment of the invention the light sensing element used is an LDR whose light sensing spectrum substantially corresponds to that of the human eye so that the arrangement also provides a physiologically appropriate and natural switching performance. To compensate for the substantially logarithmic curve configuration of that element, the arrangement then preferably uses a mechanical screen or aperture adjustment for manual preselection of the threshold because in that way the logarithmic curve can be compensated in a simple manner and without increased circuitry complexity. Alternatively it will be appreciated that such adjustment is also possible by means of corresponding electronic—for example digital—compensation.

In accordance with a preferred development of the invention for which protection is also independently claimed, the step of optically filtering out the intrinsic light emitted—for example especially by a fluorescent lamp—provides that, for the subsequent signal processing operation, only spectral components originating from the ambient light are taken into consideration so that in that way also the function of the dusk-to-dawn switch is also unaffected. Advantageously in that respect the filtered-out spectral components are below about 700 nm and above 1000 nm, that providing a favorable optical intrinsic light compensation effect, in particular for a fluorescent lamp.

An optical filter device of that kind with a band pass characteristic can be embodied for example in the form of a series connection of two discrete filter elements, or the housing of an electronic photoelectric element itself, which provides the light sensing element, could suitably have such an optical filter action, for example by virtue of a coating thereon.

The delay device which is provided in accordance with a development of the invention advantageously provides that, during the start-up or warm-up phase for example of a fluorescent lamp, spectral pulses appearing in the spectrum which is taken into consideration for the evaluation operation, in the first minutes of operation,. do not adversely affect proper operation of the dusk-to-dawn switch.

According to a further development of the invention, the delay provided by the delay device upon activation of the fluorescent lamp may be variable, and may be set and determined depending on a switching behavior of the fluorescent lamp in a preceding activation cycle. More particularly, if, in such a preceding activation cycle, the fluorescent lamp had been flickering, i.e. had turned off and on again within a period of less than 30 seconds, for example, then for a subsequent activation cycle, the delay time will be extended.

Finally, the dusk-to-dawn switch may preferably also be a component of a lighting system which additionally has a movement sensor or other detection devices, wherein particularly for use in an office and/or factory environment, such a dusk-to-dawn switch can be designed to be removably fixed to various locations of a lighting system.

Figure 2:
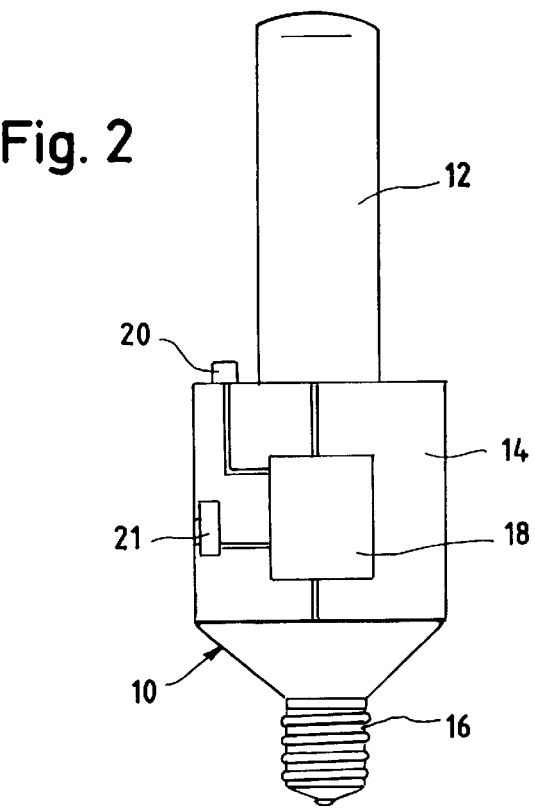
Figure 3:
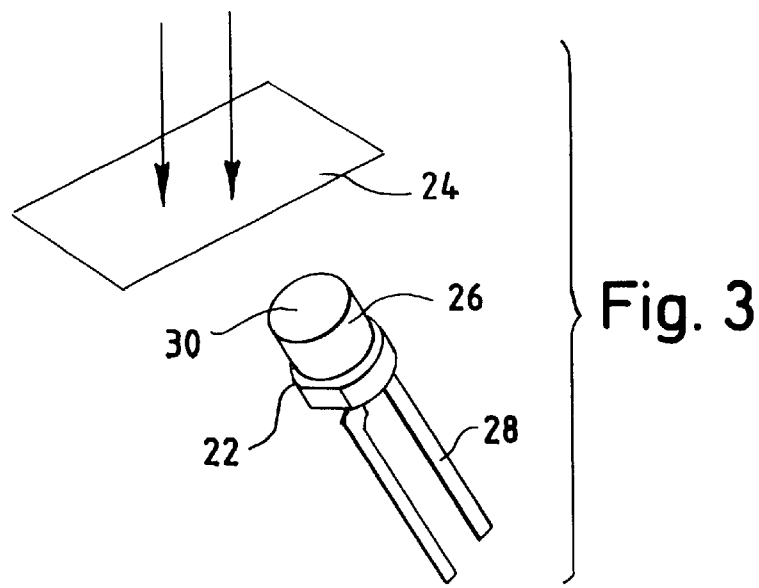
Figure 4:
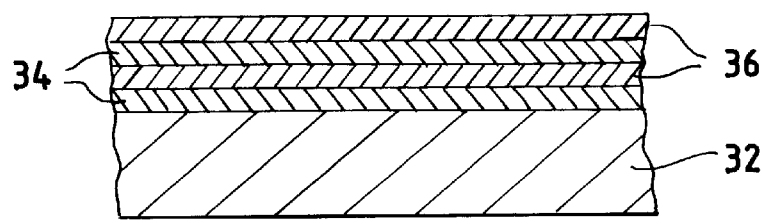
Figure 5:
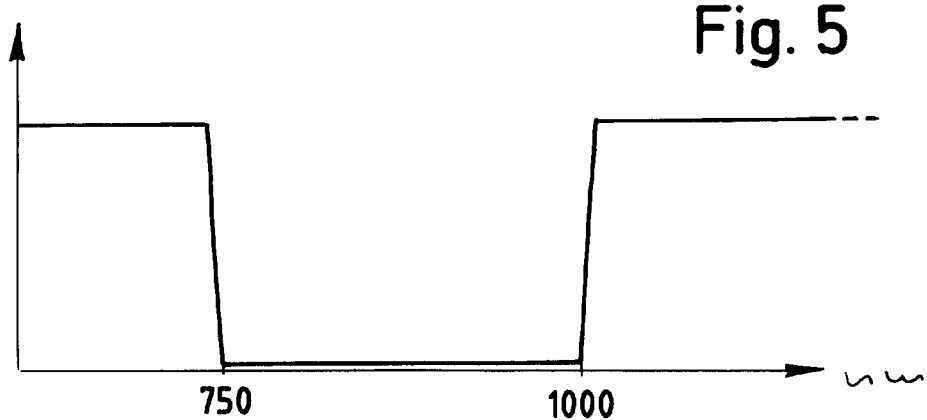
Figure 6:
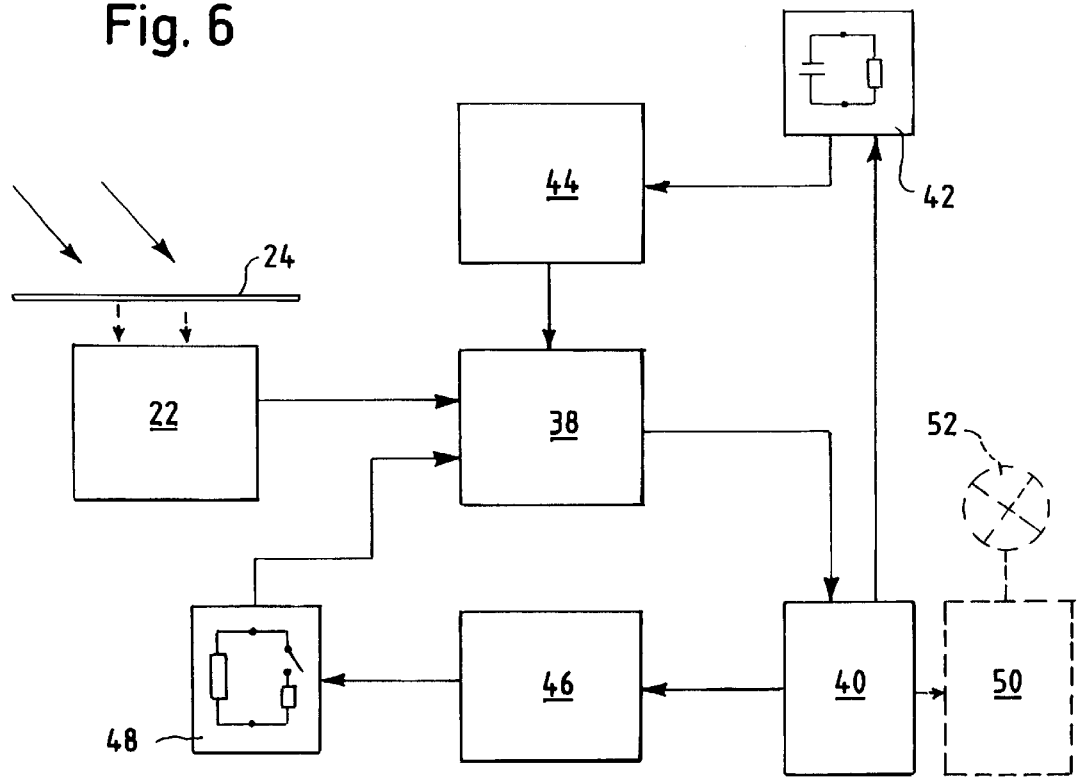
Figure 7:
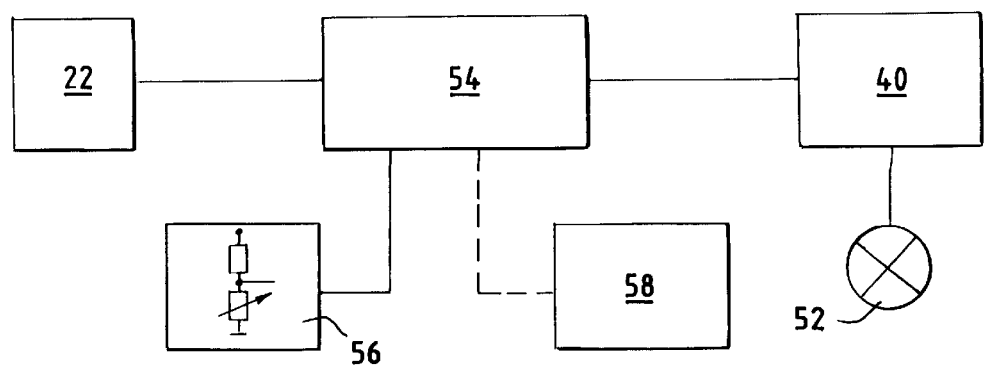
Figure 8:
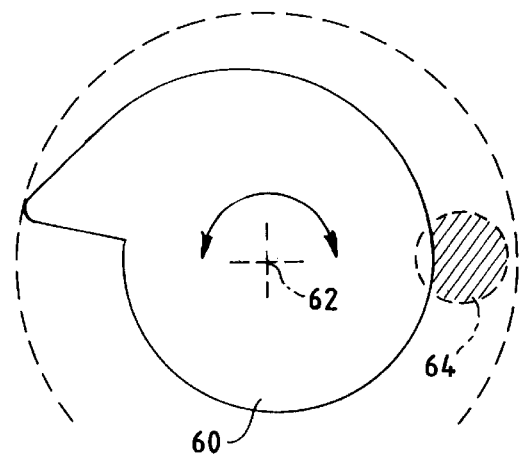
Figure 9:
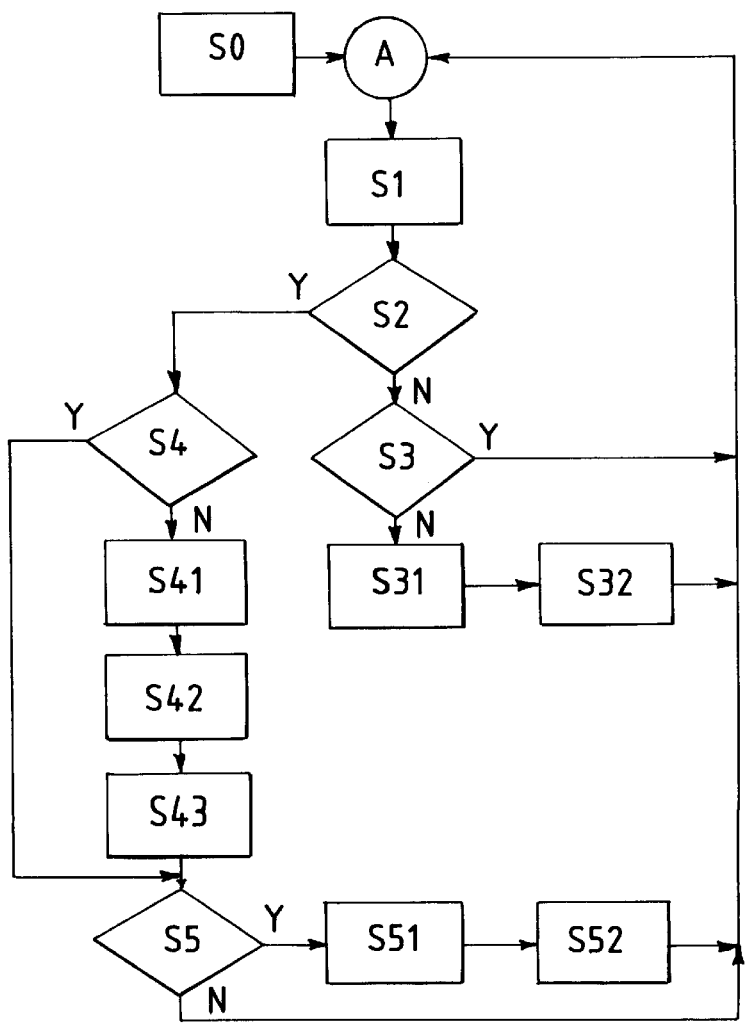
Figure 10:
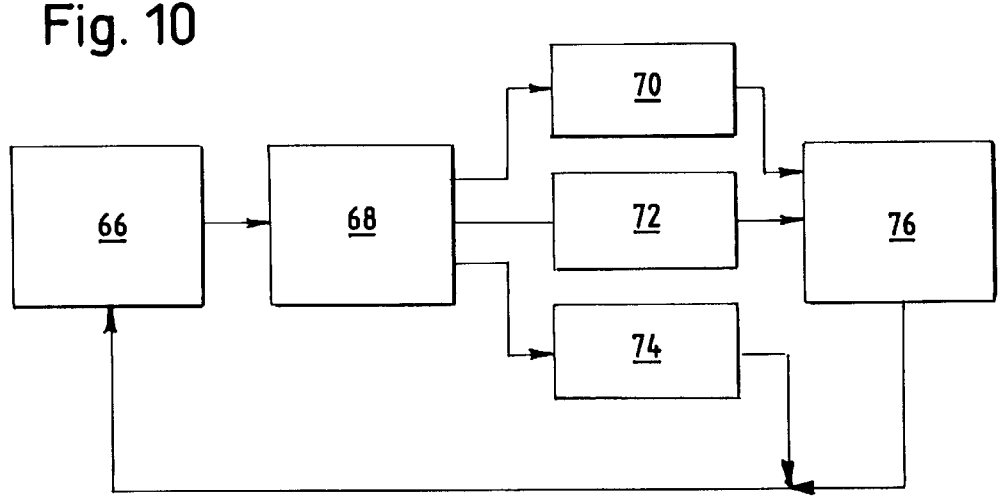
Figure 11:
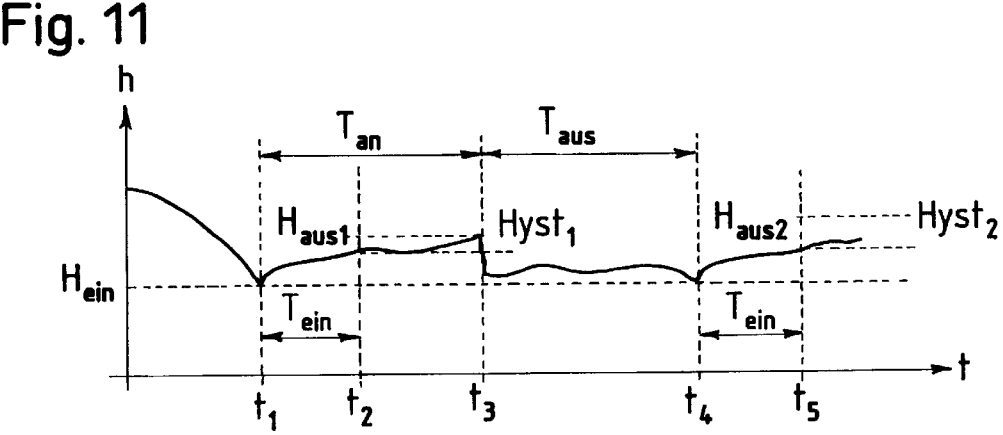
Figure 12:
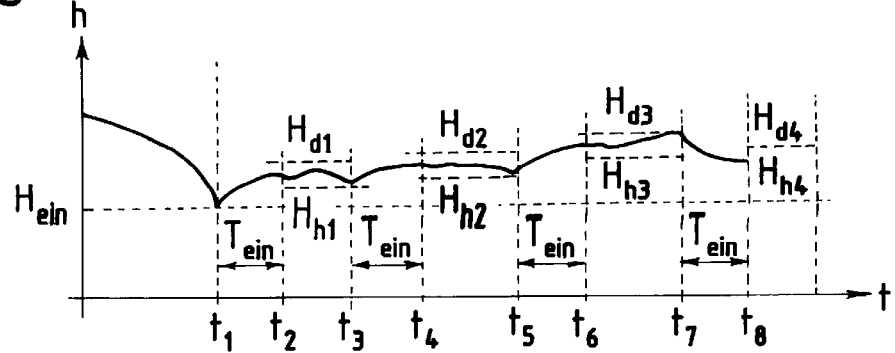

Further advantages, features and details of the invention are apparent from the following description of preferred embodiments and with reference to the drawing in which:

FIG. 1 shows a wavelength spectrum of a conventional fluorescent lamp for actuation by the dusk-to-dawn switch according to the present invention, FIG. 2 is a diagrammatic, partly sectional side view of the dusk-to-dawn switch in the installed condition in a light according to a preferred embodiment, FIG. 3 shows a phototransistor for use in the dusk-to-dawn switch and an edge filter diagrammatically arranged in front of same in the beam path, FIG. 4 is a sectional view of the edge filter, FIG. 5 shows a diagram with the attenuation characteristic of the edge filter, FIG. 6 shows a block circuit diagram with the essential operational components of the dusk-to-dawn switch in accordance with a further preferred embodiment, FIG. 7 shows a block circuit diagram of the dusk-to-dawn switch according to a further advantageous development of the invention, FIG. 8 is a diagrammatic plan view of a mechanical aperture for regulating the response threshold of the sensor in accordance with a development of the invention which is to be considered as the best mode, FIG. 9 shows a flow chart with method steps or functional units for illustrating the mode of operation of the dusk-to-dawn switch according to the invention in a further advantageous development thereof, FIG. 10 shows a block circuit diagram illustrating the co-operation of functional groups in a use of the dusk-to-dawn switch according to the invention with a stepwisely dammable lighting means, FIG. 11 is a diagrammatic view of signal configurations and switching times in the operating procedure of the dusk-to-dawn switch according to the invention as shown in FIG. 9, and FIG. 12 is a diagrammatic view of signal configurations and switching times in the operating procedure of the dusk-to-dawn switch according to the invention as shown in FIG. 10.

The diagram in FIG. 1 shows a typical wavelength spectrum of a commercially available fluorescent light which emits essentially white light. In the diagram, for that purpose the light wavelength is plotted along the abscissa (in nm) and the respectively associated radiation output is plotted along the ordinate. The wavelength range identified by the arrow A approximately indicates the range of light which is visible to the human eye.

As can be clearly seen from the diagram in FIG. 1 above the range of visible light in the infra-red range is a wavelength peak in the spectrum, whose relative radiation output is considerable and which is at 1014 nm, due to the mercury component in the gas discharge tube.

As the inventors have found, between that upper wavelength peak and the visible light spectrum of the fluorescent lamp, there is a wavelength range (marked by B in FIG. 1) which—in the stabilized operating condition of the fluorescent lamp after the warm-up phase—is substantially free from light emission.

It is a feature of the dusk-to-dawn switch according to the invention that that wavelength range B which is approximately between 750 nm as a lower limit and 1000 nm as an upper limit is used for reliable measurement of the ambient light as the range B on the one hand is substantially unaffected by the light spectrum emitted by the fluorescent lamp, but on the other hand, although it is already in the infra-red range beyond the light spectrum which is visible to the human eye, it can sufficiently accurately supply a value which is representative of the ambient light (the relative radiation strength of the ambient light in that spectral range B is substantially proportional to the visible ambient light and in that respect is therefore representative).

FIG. 2 is a diagrammatic, partly sectional side view of a fluorescent lamp 10 with a dusk-to-dawn switch in accordance with a preferred embodiment of the present invention.

A fluorescent tube 12 to be actuated by the dusk-to-dawn switch is diagrammatically shown as being fitted on to a housing 14, the housing 14 having a screw base 16 at the end opposite to the lighting means 12. A dusk-to-dawn switch which is formed on a circuit board 18 is held in the housing 14, is supplied with voltage by way of the base 16 and controls the fluorescent tube 12. A light sensor 20 having an edge filter, which is described in greater detail hereinafter, is connected to the circuit 18. In the illustrated embodiment by virtue of its being mounted on the top side of the housing, the light sensor 20 is in direct light contact with the lighting means 12 so that light emitted by the lighting means 12 can fall directly on to the sensor 20.

In addition the circuit 18 is connected to an adjusting element 21 which is accessible from the exterior through the housing and which is provided in a suitable manner for adjusting a response threshold, lighting period or the like further parameters.

FIG. 3 is a diagrammatic view of a phototransistor 22 with edge filter plate portion 24 arranged in the beam path thereabove. The phototransistor has a housing 26 and connecting legs 28, wherein the housing 26 is closed at its end provided for the incidence of light, by a lens 30.

The phototransistor 22 is for example a commercially available silicon-NPN-phototransistor which is responsive to the infra-red light spectrum and which has an epoxy resin housing. In the described embodiment the lens 30 of the phototransistor 22 is so designed that it itself acts as a filter and blocks out the spectral range below about 750 nm. The edge filter plate portion 24 is in turn in the form of an optical filter which blocks out the spectral range above about 1000 nm.

In co-operation in the beam path therefore that arrangement provides a band filter with the characteristic of a band pass—only the spectral range of about 750 to 1000 nm is transmitted very substantially in unattenuated form while the spectral range at respective sides of those limits is blocked off or heavily attenuated. That attenuation characteristic of the resulting filter is shown in idealized form in FIG. 5, in which diagram the wavelength is again plotted along the abscissa and the relative attenuation of the filter is plotted along the ordinate.

FIG. 4 is a detail view in section through the edge filter plate portion 24 showing the structure of such a dielectric filter.

As shown in FIG. 4, dielectric layers 34 and 36 are applied to a substrate 32 which can be for example glass or a suitable plastic material—at any event the substrate must be transmissive in respect of the wavelength range in question, of between 750 and 1000 nm. Those dielectric layers 34, 36 are applied to the substrate 32 for example by vapor deposition and comprise metallic material, for example ZnS. To produce the desired filter action, in the illustrated embodiment the dielectric layers 34, 36 are alternately in the form of a stacked sequence of low-refraction layers 34 and high-refraction layers 36. It will be appreciated however that any other suitable structure for such a filter can be used as long as the blocking action occurs (in this case: a low-pass action at about 1000 nm). The desired edge gradient of the filter characteristic—which in the ideal case should be as perpendicular as possible—is produced by a suitable selection in regard to the nature and number of the dielectric layers to be produced, on the substrate.

Alternatively the phototransistor 32 can also be in the form of a conventional phototransistor without a filter property in the light-incident region; in that case the required band filter action would be produced by successively introducing two edge filter plate portions of suitable design into the beam path between the light incidence and the light receiving element.

It will be appreciated that alternatively the lens 30 which in the embodiment of FIG. 3 already has a filter action in regard to spectral components below 750 nm (high pass) can additionally be provided with a vapor deposit/coating, for example of the kind described in connection with FIG. 4, so that in that case the phototransistor itself, in its light-incidence region, must have a band filter of the required kind and no additional filter elements have to be introduced into the beam path.

According to a further alternative embodiment of the invention, the phototransistor 32 may comprise a housing having the desired band pass characteristics. Particularly, a low pass edge at about 1000 nm, as realized by an appropriate housing material and/or coating applied thereon will provide for the blocking of the disadvantageous spectral peak at 1014 nm, and additionally, a suitable lower edge providing the high pass characteristics at around 750 nm may also be realized directly through the phototransistor (or photodiode) element itself.

The block circuit diagram in FIG. 6 shows the structure and mode of operation of the dusk-to-dawn switch in accordance with a further preferred embodiment of the present invention.

The two arrows which point inclinedly on to a filter—for example an edge filter plate portion 24 as described with reference to FIG. 3—indicate the incident light. In that respect, in contrast to the known state of the art, it is in no way necessary for the intrinsic light of the fluorescent lamp to be removed from that beam path, by optical measures. On the contrary it is also possible for intrinsic light of that kind to be incident on the filter, without the function and the mode of operation of the dusk-to-dawn switch being adversely affected thereby, as will be described hereinafter.

Incident light which passes through the filter 24 falls on to a photoelectric element which for example can be provided by the phototransistor 22 described with reference to FIG. 3. The electronic signal produced or influenced by the photoelectric element 22 is received by a first comparison and control circuit 38 and compared to a reference potential which is provided by a reference potential unit 48. In that respect, account is to be taken of the fact that, due to the action of the filter 24 (or a filter of the photoelectric element 22 itself), the first comparison and control circuit 38 only receives an electrical signal which is representative of light radiation in the wavelength range between 750 and 1000 nm (range B in FIG. 1). In that respect therefore the received electrical signal already represents a signal which has been very substantially freed of the light spectrum emitted by the fluorescent lamp and which is therefore uninfluenced by the fluorescent lamp.

When a suitable threshold which is predetermined by the reference potential unit 48 and which gives the switch-on moment in time under twilight lighting conditions is exceeded, a switch 40 which switches on the lighting means is activated as a reaction to the first comparison and control circuit 38. If on the other hand when the lighting means (fluorescent lamp) is switched on the signal level at the input of the first comparison and control circuit 38 falls—and therefore the ambient brightness increases to such an extent that the fluorescent lamp is to be switched off—the first comparison and control circuit 38 is put into a position of detecting that the relevant parameter has fallen below the reference threshold and in response thereto the switch 40 is to be deactivated, this being uninfluenced by the intrinsic light from the fluorescent lamp which is incident on the filter 24 at that time.

That above-described operative chain represents the idealized normal situation of a dusk-to-dawn or twilight control of a fluorescent lamp in accordance with the present invention, wherein in accordance with the invention, in spite of incident intrinsic light, upon an increase in ambient light (outside light), the circuit is enabled to detect that the fluorescent lamp is no longer required and can thereupon be deactivated. The advantageous effect can already be essentially achieved by virtue of the fact that the intrinsic light of the fluorescent lamp itself is cut out by the described edge filters in the above-described manner, and thereby subsequent signal processing is substantially unaffected.

In practical operation however there is frequently the problem that, in the start-up or warm-up phase of a fluorescent lamp, immediately after firing thereof, in addition to the spectrum shown in FIG. 1 the lamp emits spectral components in the range which is sensed and evaluated by the present dusk-to-dawn switch (range B in FIG. 1). That would then have the result that, during the start-up phase (which typically can last up to two minutes) the lamp would present a flicker due to the lamp being continuously switched on by the dusk-to-dawn electronics and then switched off again, due to the light emission in the range B.

In accordance with a particular development of the invention, that effect is countered in that, after the switch 40 has been activated for the first time (that is to say after the fluorescent lamp has been switched on by a decision from the first comparison and control circuit 38), a timing member 42 is activated; for a preset period of time which corresponds to the described warm-up phase, the timing member 42 prevents further signal processing of the incident light of the first comparison and control circuit 38 (also referred to herein as a switching unit 38) as long as the dead time which is predetermined by the timing member 42 has not expired. That deactivation of the first comparison and control circuit 38 during the dead time which is predetermined by the timing member 42 is embodied in the block circuit diagram shown in FIG. 6 by a second comparison and control circuit 44.

As a result any signal influencing effect in respect of the first comparison and control circuit 38 is thereupon suppressed during the for example first two minutes after the light is switched on, so that admittedly as a result the lamp always remains switched on at a minimum for that period of time, but on the other hand the arrangement is not in any way influenced by disturbance or interference emissions from the fluorescent lamp during the warm-up phase in the range B in FIG. 1.

According to a further alternate embodiment of the invention, the delay (dead) time preventing further signal processing of the incident light, can be made variable. More particularly, and depending on the switching behavior of the device in a preceding activation cycle, the dead time can be extended, or (again) reduced to a minimum delay time: Should, for example, in a preceding activation cycle, and upon expiration of a dead time set for two minutes, the lamp show a flickering behavior (detected, for example, by a switching off and a subsequent switching on within a short period of only a few seconds, e.g., less than 30 seconds), then it must be concluded that the dead time limiting a stationary emission spectrum is too short, and consequently, the timing member prolongs the dead time to a period of five minutes, for example, for the next activation cycle. Furthermore, should the prolonged time period still not be enough, then additional increments can be made, until a maximum delay time of, e.g., 20 minutes, is reached.

Conversely, should a long delay time reached by flickering behavior of the lamp no longer be necessary, then the variable delay time may be reset (in steps or at once) to the original, minimum delay time. This variable behavior by the timing member may best be controlled by the control circuits to be implemented with a micro controller or a comparable logic circuit.

In addition, in terms of the practical configuration of the edge filters necessary for optically cutting out the light spectrum which is emitted by the fluorescent lamp, the problem may arise that those edge filters can only be poorly adapted to the idealized attenuation configuration shown in FIG. 5. It is therefore possible that, in spite of the filters, a certain spectral component of the light emission of the fluorescent lamp passes through the filter arrangement and results in a signal which falsifies the measurement result.

For that reason, by means of switching units 38 and 46, the arrangement provides a further device for suppressing the intrinsic light produced by the fluorescent lamp itself, which in the illustrated embodiment is admittedly used together with the edge filter arrangement (acting as a band pass device)—but which can also be used alone for suppressing intrinsic light and for attaining the underlying object of the present invention (without the filter 24 having to be optically connected upstream of the photoelectric element);

As a reaction to the lamp being switched on, a third control unit 46 (also referred to herein as a switching unit 46) provides that the reference potential which is taken off for establishing the switch-on threshold by the first comparison and control circuit 38 is deliberately and specifically altered, by the amount as corresponds to the additional amount corresponding to the intrinsic light produced by the fluorescent lamp itself. For example therefore the third control unit 46, triggered by the incident level of light on the sensor 22 or a signal from the switch 40, can deliberately and specifically reduce the threshold which is predetermined by the reference potential unit 48, so that in that respect level subtraction (in respect of the intrinsic light component) is possible for the first comparison and control circuit 38 and thereupon, with a suitable reduction in outside light (and thus a reduction in the total level of light), the circuit 38 receives a threshold which is suitable for switching off the fluorescent lamp.

FIG. 6 additionally shows in broken lines a further possible configuration of the present invention. For example, instead of directly activating a lighting means 52 in the form of the fluorescent lamp, the switch 40 may activate an output adjusting unit 50 which itself in turn suitably operates the lamp 52 (the output adjusting unit 50 may be for example in the form of an electronic series reactor or ballast or may be integrated in such a device).

In particular it has been found desirable if the above-mentioned output adjusting unit—beginning at full actuation output for the fluorescent lamp—successively regulates the control output down to a degree as corresponds to the actual (ambient) light conditions, for often an amount of residual light which is still present in the ambient area and which already activates the dusk-to-dawn switch does not justify full output from the fluorescent lamp which is switched on thereby. By virtue of the provision of such an output adjusting unit 50, the brightness of the fluorescent lamp could then be suitably adjusted and regulated in dependence on the ambient light, with a suitable saving action in terms of power consumption.

In that respect it has been found advantageous if such an output adjusting unit does not continuously control the operating output or power for the lighting means, but rather predetermines discrete output or power steps; for example 100%, 75%, 50% and 25% of the maximum control power for the lighting means would be suitable.

FIG. 7 shows a dusk-to-dawn switch arrangement in accordance with a further preferred embodiment of the invention. As shown in FIG. 7, a fourth control unit is provided between the sensor unit 22 which in this respect is the same as the sensor unit shown in FIG. 6 and which can optionally have a filter device of the kind described above with reference to FIGS. 3 and 4 respectively—and a switch 40. The fourth control unit is preferably in the form of a microcontroller which is programmed with suitable software. Connected to that fourth control unit are a threshold unit 56 and, in accordance with a further embodiment, a non-volatile, erasable and re-writable memory 58.

Basically the fourth control unit 54 embodies the principle described hereinbefore with reference to FIG. 6, of compensation by active threshold displacement of the response threshold when the fluorescent lamp 52 is switched on. However the mode of operation of the fourth control unit 54 differs from the preceding embodiments insofar as, when the fluorescent lamp 52 is activated, the unit 54 does not for example displace the response threshold by a threshold value (which is admittedly suitably preselected) but which ultimately is nonetheless constant, but it makes the amount of the displacement of the threshold itself dependent on the respective level of intensity of the incident intrinsic light.

For example, more specifically, depending on the position of installation of a lamp having the dusk-to-awn switch, the proportion of the intrinsic light from the lamp which is reflected back on to the sensor can fluctuate considerably; and an amount of the response threshold displacement, which is determined for example by resistors, cannot adequately take account of those fluctuations which are caused by the position of installation, so that in spite of this compensation effect the amount of intrinsic light may be so high that it exceeds the fixedly set compensation component. That would in turn result in the above-described disadvantageous flickering of the light. In the reverse case (that is to say with a very low level of intrinsic light reflection), the preset constant threshold displacement could overcompensate for the amount of intrinsic light from the light itself. The result of this would be that the lamp goes out at a very much higher level of brightness than that at which it goes on, that is to say a high degree of hysteresis. That operating characteristic is also disadvantageous.

The arrangement shown in connection with the block circuit diagram in FIG. 7 further improves the circuitry described with reference to FIG. 6, to the effect that the fourth control unit 54 specifically measures the intrinsic light incident on the sensor 22 and, from a comparison of the incident light when the lamp is switched on (that is to say ambient light and intrinsic light are incident on the sensor) and when the lamp is switched off (only ambient light is incident) respectively, it ascertains the amount of intrinsic light by computation.

In order to avoid faulty measurements, the respective measurement values are averaged over a suitable period of time (for example a few minutes) and put into intermediate storage so that two sufficiently accurate measurement values are-available for forming the difference. The difference then yields the amount of intrinsic light which is directly proportional to the magnitude of the displacement of the threshold value. In addition that value can be stored in a non-volatile memory, for example an EEPROM, so that it is available even after a power failure.

In addition a hysteresis effect by way of which the switch 40 is then operated can be embodied in the fourth control unit 54 in a suitable manner—by adaptation of the software.

In operation—starting from the condition of bright but decreasing ambient light, that is to say with the lamp not yet activated—the lamp is activated when the switch-on threshold is reached. At the same time the value that was last measured in respect of the (pure) ambient brightness is stored in the memory as the first value for the difference-forming operation. Directly as a reaction to the lamp being switched on or delayed by a predetermined time (for example the warm-up time, see above), measurement of the total incident light (that is to say: intrinsic light +ambient light) then occurs, which again takes place over a predetermined period of time which is defined by the twilight lighting conditions and variations and, averaged, yields the second value for the difference-forming operation. The switch-off threshold is then calculated from the difference between that second value and the first value, possibly taking account of a predetermined hysteresis effect.

The advantage of such intrinsic light compensation which specifically measures the intrinsic light produced by the light itself lies therefore in the continued operability and variable adjustability of the dusk-to-dawn switch, even in relation to a level of intrinsic light which is high due to a high degree of reflection, and in a substantially lower level of hysteresis which more specifically can be kept low as the switch-off threshold is displaced in accordance with the amount of intrinsic light or the measurement value is suitably compensated. The lamp is switched on and off respectively only with a slight difference in ambient brightness.

In accordance with a further preferred embodiment the manual presetting of the response threshold, which is effected for example by means of the unit 56 in FIG. 7, can also be embodied in the manner of a learning mode: in that case for example the threshold device 56 in FIG. 7, instead of an adjustable resistor for manual presetting of the response threshold, would have a learning unit formed from an actuation device, a sensing unit and a memory. Then, in the case of a level of ambient brightness which is suitable for formation of the threshold value (with the fluorescent lamp switched off), an operator, by means of the actuation device, could activate the sensing unit which in turn (by measurement) ascertains a threshold value corresponding to the instantaneous ambient light, and stores the corresponding measurement signal in a memory. That stored measurement signal would then be available for future access as a preset threshold value, until an operator overwrites the set and stored value with another, by renewed actuation.

In the described embodiments of the invention, the mode of operation of which is based on a change in the response threshold triggered by the switched-on condition of the lamp—whether the change is by a constant value as in FIG. 6 or by a variable threshold value corresponding to the actual intrinsic light conditions, as described in FIG. 7—, it should also be pointed out that the advantageous effects according to the invention can be achieved not only in connection with fluorescent lamps, but on the contrary this invention can be used in relation to any types of lamps and lighting means whose intrinsic light disadvantageously has an adverse effect on a light sensor for ambient light; therefore intrinsic light compensation is required.

While the above-described embodiments used a photoelectric element which was embodied for example by the (silicon) phototransistor described with reference to FIG. 3, in accordance with a further preferred embodiment or best mode it is possible to replace that phototransistor by a CdS-photoelectric element (LDR), such an LDR having the advantage that its wide-band spectral sensitivity approximates to the sensitivity of the human eye and thus permits physiologically favorable control of the dusk-to-dawn switch according to the invention. Such a per se known LDR does have the property that its sensitivity characteristic (relative to the level of incident light) is strongly logarithmic so that user-friendly setting of the response or sensitivity threshold of the LDR-photoelectric element—in particular in connection with the above-described regulating procedures and the implementation thereof in terms of circuitry technology—is not without problems. In accordance with the invention therefore it is proposed that, when using an LDR-photoelectric element in connection with the dusk-to-dawn switch shown in FIG. 7, the adjusting value device 56 which is embodied by means of an adjustable resistor should be replaced by a mechanical screen or aperture device 60 which is actuable by an operator and which, as shown in FIG. 8, is in the form of a disc with a logarithmically increasing spacing of the edge relative to a central axis 62. As shown in FIG. 8 an opening 64 formed in the housing, for the LDR, is covered to a greater or lesser degree depending on the rotational position of the disc 60, wherein the illustrated shaping of the screen disc 60 compensates for the logarithmic (or exponential) characteristic of the LDR by virtue of the fact that rotation of the disc 60 produces logarithmic masking of the opening 64.

Reference will now be made to FIG. 9 and the associated representation of the signal configuration as illustrated in FIG. 11, to describe hereinafter a control according to the invention for a lamp—not necessarily restricted to a fluorescent lamp but suitable in principle for all types of lamp—, which is preferably embodied with the configuration shown in FIG. 7 in the form of a block circuit diagram, using a microprocessor or microcontroller; it is however self-evident to the man skilled in the art that all function blocks or procedures shown in FIG. 9 (and also in FIG. 10) can be implemented by suitable hardware components.

In step S0—when the lighting means is switched off—the ambient brightness is detected by the light sensing unit (for example the LDR or the phototransistor described hereinbefore with reference to FIG. 3), and electronically stored as a value which is averaged over a predetermined period of time.

In step S1 the total brightness incident on the light sensing element is then continuously ascertained and in addition the threshold value is established for switching on the light (predetermined by an electronic setting in accordance with the unit 56 or a mechanical setting in accordance with the screen disc 60). Step S2 thereupon involves deciding whether the lighting means is switched on (j) or is still in the switched-off condition (n).

To clearly illustrate the procedure involved, it should be assumed that the dusk-to-dawn switch has just been put into operation and the lamp is therefore still in the switched-off condition while on the other hand the level of ambient brightness is so low that it is below the set control value.

Consequently the subsequent decision in step S3 (establishing whether the brightness value ascertained in step S1 is above the threshold value) results in a negative decision (n), whereupon in step S31 the lighting means is activated (time $t_1$ in FIG. 11). Thereupon, in step S32, a delay time $T_{ein}$ is activated, which predetermines the minimum switch-on period for the lighting means after activation (step S31); that period $T_{ein}$ lasts until the time $t_2$, whereupon the operating procedure branches back again to the node A.

In the second run through the loop, in step S1 the brightness value or the predetermined threshold value is again detected, whereupon S2 now involves establishing that the lighting means is in the switched-on condition (j). Step S4 then involves checking whether a switch-off value (that is to say a brightness value at which the dusk-to-dawn switch deactivates the lighting means) has already been established; that is not yet the case (n) in the existing operating condition. Thereupon in step S4, by interrogation of a predetermined stored hysteresis value table, a switch-off value is defined, which is predetermined for the current brightness value (detected in accordance with S1), and in subsequent step S42 the procedure involves correction of that switch-off value with a hysteresis effect, in dependence on the preceding operating conditions (described in greater detail below), whereupon in step S43 the definitive switch-off value is ascertained by addition of the hysteresis table value in accordance with S41 and the correction value in accordance with S42, and stored (value $H_{aus1}$ in FIG. 11 at the time $t_2$; the instantaneously applicable brightness value also concerns $t_2$). In FIG. 11 the hysteresis effect which is formed in that way and which is based on the current brightness value (that is to say time $t_2$) is identified by 'Hyst1'. It is only when the detected total brightness (that is to say ambient brightness and, as the lamp is activated, also the lamp's own intrinsic light) exceeds the switch-off value $H_{aus1}$ in accordance with that hysteresis effect, that the lighting means is deactivated again.

That assessment now takes place in step S5 in which the switch-off value ascertained from the brightness value +(corrected) hysteresis value is compared to the actual brightness value; at the operating time at that moment, as the switch-off value was only just ascertained in steps S41 to S43, that is generally not yet the case so that (branch n) the procedure branches back to the node point A in FIG. 9. As the switch-off value is now fixed, in further continuous runs the flow chart follows the path: A–S1–S2(j)–S4(j)–S5 until comparison in step S5 shows that the total brightness in the meantime has risen to such an extent that it exceeds the fixed and stored switch-off value. In the illustration in FIG. 11—which in this respect reproduces a total brightness pattern by way of example, plotted in relation to time—that is the case at time $t_3$: the flow chart then branches at step S5 (total brightness greater switch-off value: j) to step S51 and there deactivates the lighting means and in step S52 activates a further delay time giving the minimum period of time before the lighting means can be activated again at all. Deactivation of the lighting means occurs at the time $t_3$; as shown in FIG. 11, due to the elimination of the intrinsic light component, that results in a marked drop in the detected total amount of light. Therefore, extending between the switch-on time $t_1$ and the switch-off time $t_3$ there is the switch-on phase $T_{an}$ which is also detected with switching-off of the lighting means in S51, and stored.

During the subsequent period of time up to the time $t_4$, the brightness periodically detected in S1 (only ambient brightness as the lighting means is switched off) is always above the threshold or reference value $H_{ein}$. In FIG. 9 the succession of the method steps is therefore as follows: S1–S2(n)–S3(j)–A–S1, and so forth.

It is only when at the time $t_4$ the ambient brightness falls below the threshold value $H_{ein}$ again that the comparison in step S3 results in renewed activation of the lighting means (S31) and the minimum switch-on period $T_{ein}$ due to the delay unit S32. At the same time in step S31—which in that respect terminates a switch-off phase $T_{aus}$ of the lighting means—the period of $T_{aus}$ is fixed and stored.

If then in the subsequent cycle A–S2(j)–S4(n)–S41–S42–S43——and so forth a fresh switch-off value is fixed again, then that, in accordance with steps S41 to S43, includes in S42 the switch-off period $T_{uas}$ or the preceding switch-on period $T_{an}$: if for example the switched-off phase $T_{aus}$ was only relatively short (meaning: a short time after the lighting means was extinguished, the dusk-to-dawn switch already switches on again because the level of ambient light had fallen below the switch-on threshold again and possibly only a temporary lighting condition—for example passing clouds or short sunny periods—had caused deactivation of the lighting means), the operation, which now takes place, for forming that switch-off value (or the hysteresis effect in respect of the switch-off value) will take account of that condition by virtue of the fact that the hysteresis effect is selected to be correspondingly greater. That state is shown in FIG. 11 at time $t_5$. As the switched-off phase $T_{aus}$ is considered to be too short, that fact is now taken into account in step S42 and a new switch-off value $H_{aus2}$ is formed which, in relation to the associated (total) lighting level, at the time $t_5$ is at a greater spacing (and thus constitutes a greater hysteresis effect Hyst2), than the first switch-off value $H_{aus1}$ at the time $t_2$. (In a corresponding manner, it would also be possible to form a smaller hysteresis effect when for example a preceding switch-on period had been too long).

In general terms therefore this hysteresis formation which is dependent on the operating parameters of the switch-on time and the switch-off time respectively on the one hand therefore reliably prevents the lighting means from being switched off again shortly after having been switched on (thereby preventing flickering), while on the other hand this active threshold value resolution which, as can be readily seen from the foregoing discussion, always adds to the instantaneous brightness value and then puts a hysteresis value on to same, makes it possible for the lighting strength of the intrinsic light (which for example can vary due to ageing effects or the like) to be taken into consideration automatically and independently of an external setting. Accordingly that not only has a positive influence on the level of operating comfort and convenience and the lighting characteristic of the dusk-to-dawn switch according to the invention, but also such a construction which can be implemented substantially in terms of program technology (alternatively: by hardware) permits simple and inexpensive mass production.

A-modification of the above-described embodiment will be described hereinafter with reference to FIGS. 10 and 12. While the lighting means was dynamically switched on and off with variable threshold displacement by virtue of the control procedure of the dusk-to-dawn switch according to the invention as shown in FIG. 9, it is also in accordance with the invention to use the dusk-to-dawn switch according to the invention to operate a lighting means which is variable (stepwise or stepless) in terms of the actuation and lighting power or output. Basically the flow chart shown in FIG. 9 can be directly used for such a use if step S31 (lighting means on) is replaced by a process 'lighting means a step (a predetermined amount) brighter', and correspondingly step S51 (lighting means off) is replaced by 'lighting means a step (a given amount) darker'. In that case, stepwise adaptation of the light strength (up to full power or down to complete switch-off) would then be possible. Even if theoretically variable hysteresis or switching threshold adaptation of the kind shown in FIG. 9 or FIG. 11 respectively is still possible, it is however recommended that a fixed hysteresis spacing be used to avoid additional circuitry complexity, for the situation involving the steplessly or stepwisely switched (dimmed) lighting means.

FIG. 10 shows such a situation of use: A sensing or measuring device 66 detects the ambient brightness (without intrinsic light from the lighting means) and the total brightness (ambient light + intrinsic light). In a comparison unit 68 which additionally has a memory device for threshold values and a hysteresis device, for example of the kind described with reference to S41 in FIG. 9, a decision is made as to whether the lighting means is to be made one step lighter (first control device 70), darker (second control device 72) or whether it remains unchangeable in respect of its brightness value (third control device 74). The loop is closed back to the sensing unit 66 by way of a delay unit 76 which predetermines the minimum time during which the light output which has been switched higher (first control device 70) or lower (second control device 72) is to remain at that level.

FIG. 12 shows by way of example a control procedure in respect of such a dusk-to-dawn switch arrangement for a stepwisely switched (dimmed) switching means, wherein once again the variation in brightness is plotted in relation to time and the respective hysteresis effects are marked: at the time $t_1$ the ambient light falls below the threshold value $H_{ein}$, the lighting means is switched on and it remains in the switched-on condition for the minimum switch-on time $T_{ein}$. At the time $t_2$ a—doubled—hysteresis effect with an upper hysteresis value $H_{d1}$ for switching down and a lower hysteresis value $H_{h1}$ for switching up is then formed. At time $t_3$ the total amount of light (intrinsic light on the first switching step + ambient light) falls below the lower hysteresis value $H_{h1}$ whereupon the next higher output stage is activated by the action of the first control device 70 and once again the mini switch-on period $T_{ein}$ remains at that activation step. At the time $t_4$ a fresh hysteresis formation operation is conducted, once again by establishing an upper switching-down hysteresis value $H_{d2}$ and a lower switching-up hysteresis value $H_{h2}$ (in contrast to the above-described, on-off structure shown in FIG. 9, in FIG. 11 in the present embodiment the hysteresis spacing is constant, compared to the first hysteresis effect at $t_2$). If then once again at time $t_5$ the total brightness value falls below the switching-up threshold $H_{h2}$, the output stage which now follows is activated by the action of the first control device 70 and maintained for the mini switch-on period $T_{ein}$ until the next hysteresis formation operation again takes place at the time $t_6$.

In this example of operation, the total level of light now exceeds the upper hysteresis value $H_{d3}$ (that is to say the switching-down threshold) at the time $t_7$ so that the action of the second control device 72 means that the arrangement is again switched to the next lower level of control power for the lighting means and that new switching condition is also delayed by the delay time $T_{ein}$. In the described embodiment this delay time $T_{ein}$ which is generated by the delay unit 76 is shorter than the delay times described in FIGS. 9 and 11 as the various switching thresholds and power stages in that respect permit variable control of the light.

Accordingly therefore in the case of actuation of the lighting means at a variable power level (in contrast to the above-described on-off construction), displacement in accordance with the invention of the response point for the hysteresis effect or the switch-off value is also possible so that it is always possible to take account in the optimum manner of the actual ambient and intrinsic light conditions.

Even if the embodiments described above with reference to FIGS. 8 to 12 are in principle suitable for use with any lighting means, the use thereof together with a fluorescent lamp, possibly in connection with an electronic series reactor or ballast, is particularly desirable. Particularly in relation to ageing-induced (intrinsic light) fluctuations in the case of fluorescent tubes, the present invention always permits complete suppression of the intrinsic light, independent of level. In addition it would also be possible as an additional measure to use the above-described spectral filter construction in these embodiments.

Yet a further embodiment of the present invention provides for the use of two light sensors, wherein one operates with approximately the same spectral sensitivity as the human eye (for example an LDR), and the other has its maximum sensitivity in the range of the emission maximum of the fluorescent tube. The amount of intrinsic light could then be ascertained from the signal ratio from those two sensors, so that it is possible to establish whether the amount of ambient light would be below the preselected thresholds, after the lighting means is switched off. The use of a hysteresis effect could be completely prevented by virtue of that construction as the arrangement can be regulated to a given brightness value.

In regard to cutting out the intrinsic light which falls on the sensor, in accordance with the invention, by means of the described filters, they are not specifically restricted to the band of 750–1000 nm specified in relation to the embodiment. On the contrary the present invention can be used in relation to all intrinsic light sources whose spectrum can be cut out of the sensing spectrum by means of filters, in which case the remaining spectrum must still permit assessment and evaluation of the ambient brightness.

In accordance with a further preferred development of the present invention the dusk-to-dawn switch can be coupled to a presence or movement sensor. That can be achieved in particular by the photoelectric element which in the above-described dusk-to-dawn switch is used for sensing ambient light being combined together in a unit with the sensor elements of a movement sensor, in which case then the edge filters for the phototransistor would possibly have to be provided suitably for same.

Such a common sensor unit can preferably be of a modular or removable nature and provided with a suitable plug—or alternatively connected in a wireless manner—and thus variably fitted to suitably provided positions of a lighting system which for example has fluorescent lamps and the associated movement sensing and dusk-to-dawn switching electronics, or can be fixed in some other suitable manner. So that activation of the lighting means then occurs only when the movement/presence sensor also detects a person, the dusk-to-dawn switch on the one hand and the motion sensor on the other hand can be connected together by means of a logic AND-connection.

I claim:

1. An automatic switching device for a fluorescent lamp comprising a light sensing element that reacts to ambient light and a switching unit designed to react to an output signal from said light sensing element to activate or deactivate said fluorescent lamp wherein said switching unit has reference threshold means, wherein activation or deactivation of said fluorescent lamp occurs in dependence on whether the output signal of said light sensing element is above or below a threshold generated by said reference threshold means, wherein a respective level of the generated threshold is dependent only on an amount of light detected by the light sensing element, and wherein delay means are provided which are so designed that for a predetermined period of time only triggered by an activation signal for said fluorescent lamp, said delay means prevent said switching unit from reacting to the output signal of said light sensing element.

2. The automatic switching device according to claim 1 wherein said reference threshold means have means which reduce the threshold when the fluorescent lamp is activated, by an amount which substantially corresponds to the amount of light incident on said light sensing element from said fluorescent lamp.

3. The automatic switching device according to claim 1 wherein said reference threshold means have measuring means which are designed for measurement of light incident on said light sensing element when said fluorescent lamp is activated and when said fluorescent lamp is deactivated, and have hysteresis means which are designed to produce a first lower threshold and a second upper threshold and produce both the first lower threshold and also the second upper threshold as a reaction to a measurement signal from said measuring means.

4. The automatic switching device according to claim 3 wherein said measuring means are so designed that upon sensing of the incident light with said fluorescent lamp activated and with said fluorescent lamp deactivated they form and store respective average values which are detected over a predetermined period of time.

5. The automatic switching device according to claim 3 wherein said hysteresis means are so designed that the spacing between the first lower threshold and the second upper threshold is variable and dependent on the amount of light measured by said measuring means.

6. The automatic switching device according to claim 3 wherein said hysteresis means have memory means for reading out respective ones from a plurality of predetermined stored threshold values for the first and second thresholds.

7. The automatic switching device according to claim 1 wherein said reference threshold means have setting means for additional manual variation of the threshold.

8. The automatic switching device according to claim 7 wherein said light sensing element is in the form of an LDR and said setting means have an apertured shield which is designed to compensate for a substantially logarithmic sensitivity characteristic of said LDR.

9. The automatic switching device according to claim 8 having means for detecting and storing a period of time for which said lighting means have been in a preceding differing switching condition and for influencing said reference threshold means in such a way that the level of the generated threshold is also dependent on said period of time.

10. The automatic switching device according to claim 3 having an output control device for actuation of said fluorescent lamp in discrete predetermined output steps, which is so designed that activation of the fluorescent lamp at the next higher output step occurs when the output signal of said light sensing element falls below the first lower threshold and deactivation of the fluorescent lamp into a next lower output step occurs when the second upper threshold is exceeded.

11. The automatic switching device according to claim 1 having optical filter means which are connected into the beam path between the ambient light and said light sensing element and which filter out spectral components emitted by the fluorescent lamp, in the manner of a band pass filter.

12. The automatic switching device according to claim 11, wherein said optical filter means comprise a housing of a photo transistor.

13. The automatic switching device according to claim 11, wherein said optical filter means comprise a housing of a photodiode.

14. The automatic switching device according to claim 11, wherein said optical filter means have band pass characteristics in a spectral range of between 700 nm and 1010 nm.

15. The automatic switching device according to claim 14, wherein the optical filter means have band pass characteristics in a spectral range of between 750 nm and 1000 nm.

16. The automatic switching device according to claim 1, wherein said predetermined period of time is constant.

17. The automatic switching device according to claim 1, wherein said predetermined period of time is variable and dependent on a switching behavior of said switching unit in a preceding activation cycle of said fluorescent lamp.

18. The automatic switching device according to claim 1, wherein said delay means comprise detection means provided for detecting a flickering of said fluorescent lamp, and for setting a longer predetermined period of time for a subsequent activation cycle of said fluorescent lamp, upon detecting said flickering.

* * * * *

UNITED STATES PATENT AND TRADEMARK OFFICE
CERTIFICATE OF CORRECTION

PATENT NO.   : 6,160,352
DATED        : December 12, 2000
INVENTOR(S)  : Steinel It is certified that error appears in the above-indentified patent and that said Letters Patent is hereby corrected as shown below:

In claim 1, line 11, after "dependent", delete "only".

Signed and Sealed this

Twenty-ninth Day of May, 2001

*Attest:*

NICHOLAS P. GODICI

*Attesting Officer*   *Acting Director of the United States Patent and Trademark Office*